United States Patent Office.

GEORGE A. KNOWLTON, OF NATICK, MASSACHUSETTS.

Letters Patent No. 99,915, dated February 15, 1870.

IMPROVEMENT IN BLACKBALLS FOR BOOT AND SHOE-MAKERS.

The Schedule referred to in these Letters Patent and making part of the same.

*To all whom it may concern:*

Be it known that I, GEORGE A. KNOWLTON, of Natick, in the county of Middlesex, and State of Massachusetts, have invented a new and improved Composition for Blackball; and I do hereby declare the following to be an exact description thereof.

Blackball is extensively used by boot and shoe-makers, and has heretofore been made principally from bayberry tallow or bayberry wax, which is quite costly, and difficult to obtain in quantity.

The object of this invention is to provide a good and cheap substitute for the bayberry tallow in the manufacture of blackball.

After many experiments I have found that the stearic acid or manufactured animal stearine of commerce is excellently well adapted to this purpose, and that blackball made from this material may be used with greater ease on a wet or dry edge. It holds its color and lustre better, and is very much cheaper than that made from bayberry tallow.

To enable others skilled in the art to make use of my invention I now give a formula for making blackball by my process.

Melt together three parts of stearic acid and one part of paraffine, (mineral wax,) with enough lamp-black to impart the desired color, and the compound may then be cooled in the form of balls or otherwise.

I sometimes add also a little of the substance known in commerce as "Brazil wax," but this is not necessary to success.

I do not confine myself to these proportions of ingredients, or to this formula, nor do I claim the paraffine as being new. But previous to my experiments stearic acid and stearine had not been used in the manufacture of blackball; and I wish to secure my right to the use of this material for this purpose, either alone or compounded with other substances.

Having thus described my invention,

I claim as new, and desire to secure by Letters Patent—

Blackball, composed wholly or in part of stearic acid or stearine of commerce, all as and for the purposes set forth.

G. A. KNOWLTON.

Witnesses:
    S. DANA HAYES,
    F. C. WOODBURN.